E. C. ENLOE.
HORSE COLLAR PAD.
APPLICATION FILED JAN. 8, 1912.
1,056,784.
Patented Mar. 25, 1913.
2 SHEETS—SHEET 2.
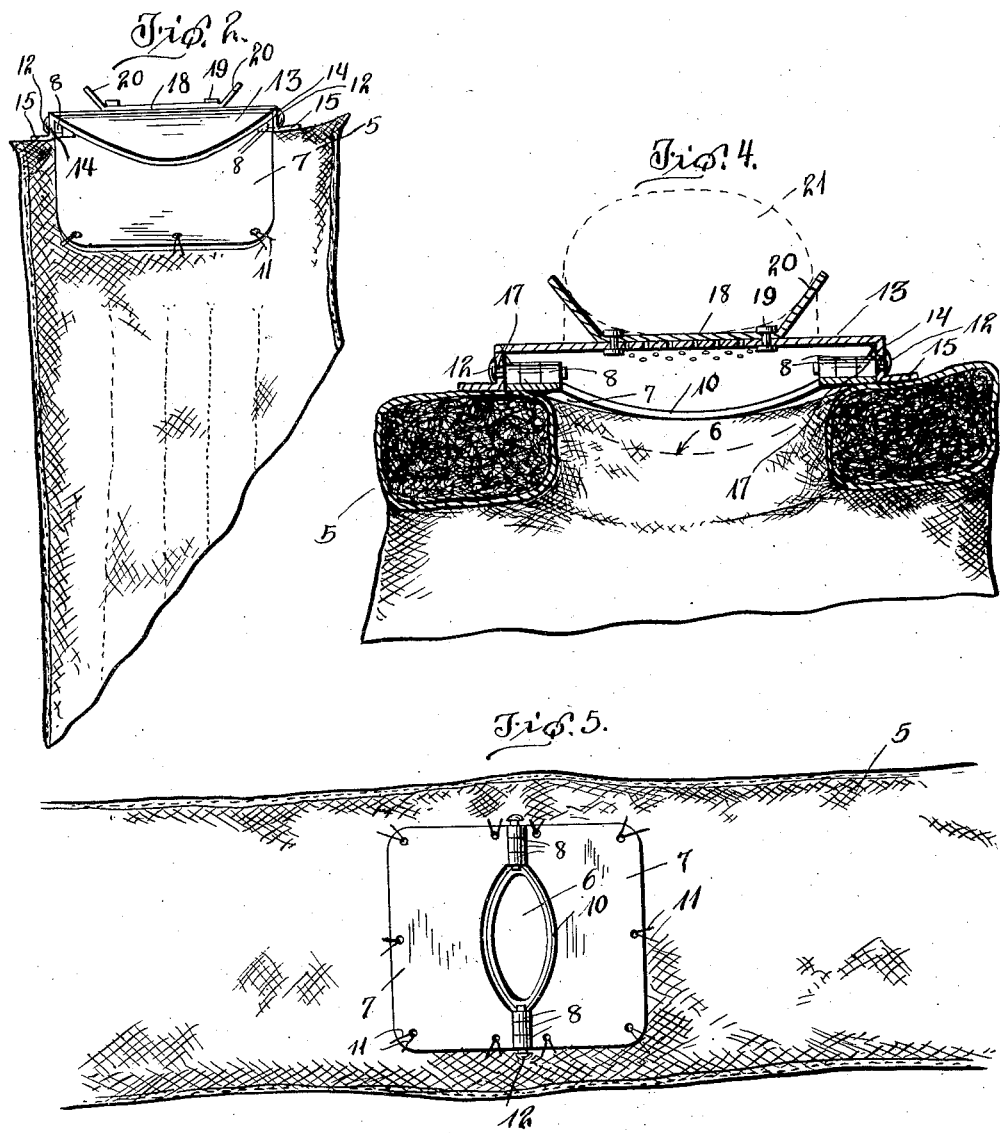

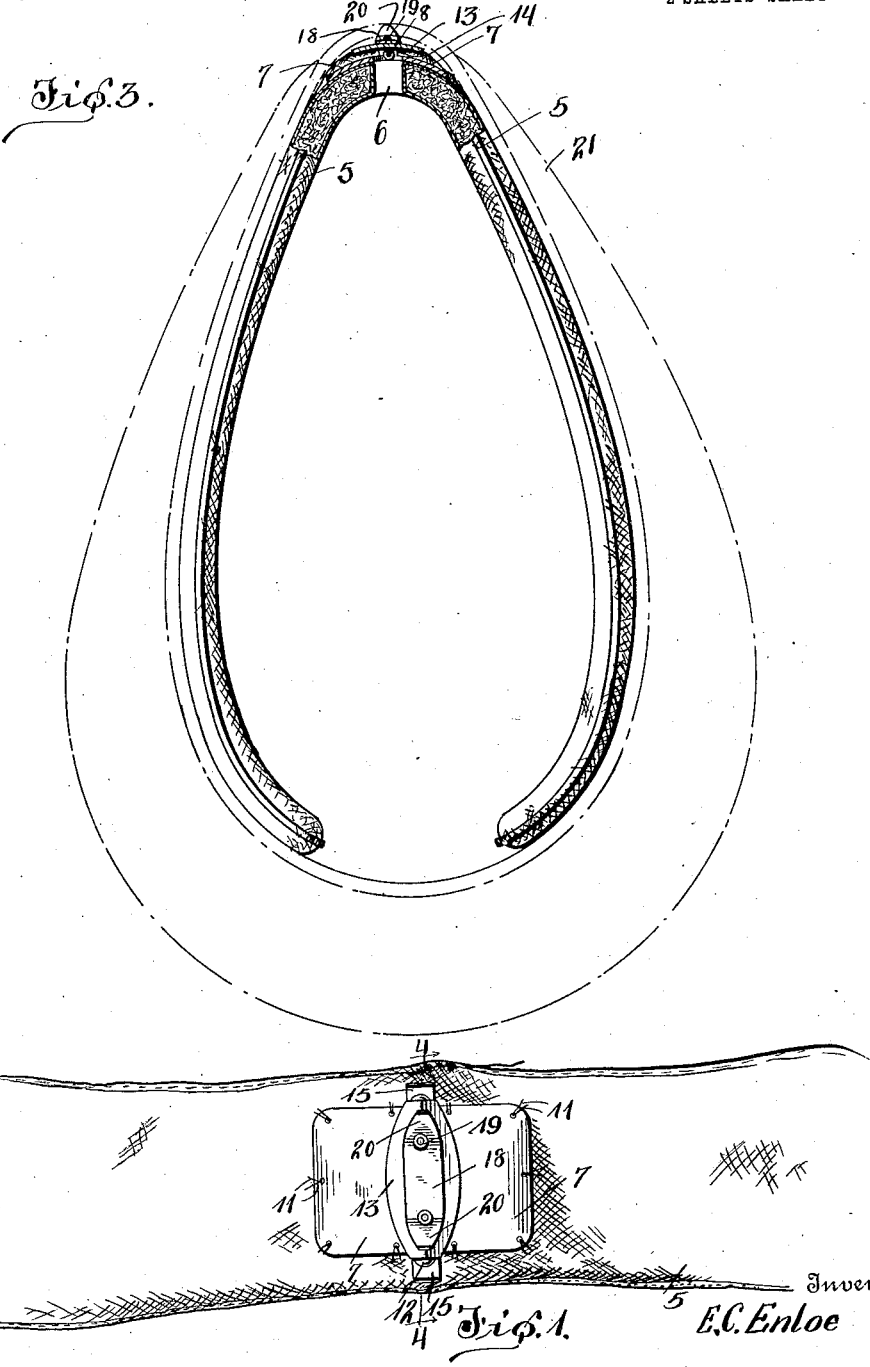

UNITED STATES PATENT OFFICE.

EDWIN CUYLAR ENLOE, OF NEW HARTFORD, IOWA.

HORSE-COLLAR PAD.

1,056,784.  Specification of Letters Patent.  Patented Mar. 25, 1913.

Application filed January 8, 1912. Serial No. 670,044.

*To all whom it may concern:*

Be it known that I, EDWIN CUYLAR ENLOE, a citizen of the United States, residing at New Hartford, in the county of Butler and State of Iowa, have invented certain new and useful Improvements in Horse-Collar Pads, of which the following is a specification.

This invention relates to an improvement in horse collar pads.

It is a well known fact that horses and especially working horses are often affected by sores which are formed as a result of the collar rubbing the wither.

The principal object of the invention is to provide a collar pad for horses so affected, the pad being formed so as to permit air to readily contact with such a sore, and thereby not only assist in quickly healing the same but also permitting of the horse to be used without danger of further injury.

Another object of the invention is to provide a pad having a central opening formed therein adapted to surround such a sore, a plate transversely disposed and secured to the pad directly above the opening and spaced from said pad to permit of air passing thereunder and thence into said opening.

A further object of the invention is to provide a plate for the purpose described which is provided with a clip adapted to receive the collar and thereby prevent its accidental displacement.

A still further object of the invention is to provide a pad for the purpose described which is composed of a minimum number of parts, is therefore simple in construction, and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims, may be resorted to without departing from the spirit or sacrificing any of the advantages of the invention.

In the drawings: Figure 1 is a top plan view of a pad constructed in accordance with this invention, Fig. 2 is a side elevation thereof, Fig. 3 is a detail longitudinal sectional view showing the application of a collar, Fig. 4 is a transverse sectional view taken on the line 4—4 of Fig. 1, showing the collar in its proper position, and Fig. 5 is a detail plan view of the collar with the plate removed.

Like reference numerals designate corresponding parts in all the figures of the drawings.

Referring to the drawings, 5 designates a collar pad which is centrally formed with an opening 6. Disposed upon the outer face of the pad are curved metallic leaves 7—7, the outer ends of the abutting edges being respectively formed with knuckles, indicated as a whole by the reference numerals 8—8, said knuckles being disposed in alinement transversely of the pad. The abutting portions of the leaves intermediate the knuckles 8 are respectively cut out to conjointly form an opening 10 which registers with the opening 6 of the pad. These leaves are secured to the pad by stitches 11 or any other suitable means. It will thus be observed that the pad and the leaves are capable of being adjusted to accommodate animals' necks of different sizes. Pivot pins 12—12 are disposed within the knuckles 8 for connecting the leaves together.

An elliptical plate 13 which is transversely curved to form a convexo-concave structure, has each end portion bent downwardly to form a wall 14 and thence outwardly to form a lip 15. Formed in each wall 14 is an opening 17 wherethrough projects a respective pivot pin 12. By means of the walls 14 the body of the plate is disposed above the leaves to permit of air entering therebetween and consequently into the opening 6 of the pad. Secured upon the plate 13 transversely of the pad is a collar-receiving clip 18. This clip is secured to the plate by rivets 19 or other suitable fastening means, and the ends 20—20 are upwardly bent for engagement with the side walls of a collar 21, and thereby retain the collar against accidental displacement. It will thus be observed that when the pad is placed around the neck of an animal and the collar around the pad air can readily pass intermediate the collar and pad and contact with the sore which may be upon the wither. It will also be observed that even should there be no sore on the wither the opening 6 of the pad will prevent any pressure and consequently will prevent such a sore being formed.

What is claimed is:

1. The combination with a horse collar pad having an opening centrally formed therein, a plate secured to the pad at each side of the opening thereof, the outer ends of the adjacent edges being respectively formed with interengaging knuckles, pivot pins disposed within said knuckles, and a collar supporting plate disposed above the opening and in spaced relation to the pad and having its ends connected to said pins.

2. The combination with a horse collar pad having an opening centrally formed therein, a plate secured to the pad at each side of the opening thereof, the outer ends of the adjacent edges being respectively formed with interengaging knuckles, pivot pins disposed within said knuckles, a collar supporting plate disposed above the opening and in spaced relation to the pad and having its ends connected to said pins, and a collar retaining clip secured to said pad.

In testimony whereof I affix my signature, in the presence of two witnesses.

EDWIN CUYLAR ENLOE.

Witnesses:
C. R. DODD,
A. A. SIMBRIC.

Copies of this patent may be obtained for five cents each, by addressing the "Commissioner of Patents, Washington, D. C."